Figure 1:
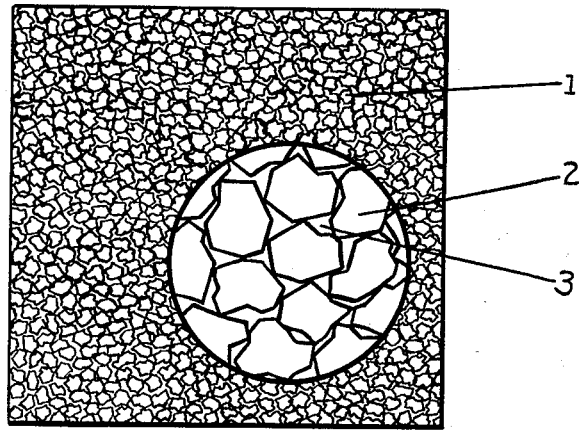

March 16, 1954  C. C. BALKE  2,672,415
PRODUCTION OF POROUS SILVER BODIES
Filed July 23, 1948

CLAIRE C. BALKE
INVENTOR.
BY George F. Mueller

Patented Mar. 16, 1954

2,672,415

UNITED STATES PATENT OFFICE 2,672,415

PRODUCTION OF POROUS SILVER BODIES

Claire C. Balke, Drexel Hill, Pa., assignor to Fansteel Metallurgical Corporation, North Chicago, Ill., a corporation of New York Application July 23, 1948, Serial No. 40,407

5 Claims. (Cl. 75—222)

This invention relates to highly porous silver bodies and to methods of preparing such bodies.

The highly porous silver bodies find use in filtration and other problems. In the filtration application silver, of course, can be used only with liquids which do not attack the silver. These highly porous bodies may also be employed for introducing gases into or distributing gases in liquids or in other gases.

The principal purpose of the present invention is to provide porous silver bodies having a substantially greater degree of porosity than has been obtained heretofore.

A further object of this invention is to provide highly porous silver bodies having a specific structure with respect to the porosity.

Other objects and advantages of this invention will become apparent from the following description and claims.

Figure 2:
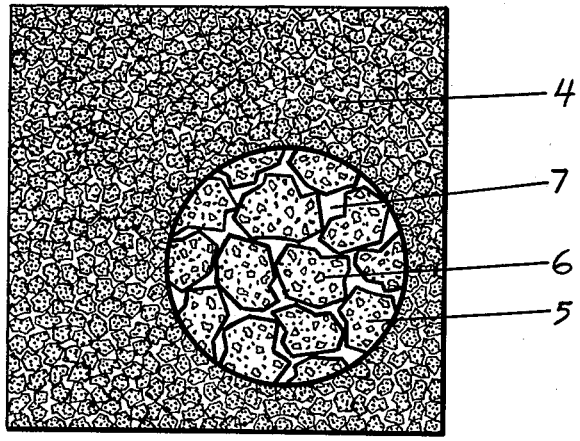

In the drawings:

Figs. 1 and 2 are elevational views, partly at an enlarged scale, of highly porous metal bodies made in accordance with my invention.

The products of this invention are made by powder metallurgy methods. In ordinary practice, the metal powder is pressed in a die of the desired shape and size to form a self-supporting body which is subsequently sintered. The porosity of the sintered body may be varied up to about 30% to about 35%.

As is well known, the specific porosity is dependent upon the particle size distribution. Ordinarily, the coarser the powder and the less fines in the powder, the greater the porosity. The porosity also varies indirectly with the pressure employed in compacting the powder. The porosity generally will vary inversely with the sintering temperature and with the sintering period. For example, high sintering temperatures and prolonged sintering periods generally result in lower porosity.

Porous silver bodies having a higher degree of porosity, that is bodies having a porosity exceeding 35%, may be prepared by thoroughly mixing with the silver powder a powdered extraneous material which is removed or expelled as a gaseous material during subsequent treatment. This extraneous material may consist of a volatilizable substance and preferably consists of a sublimable substance which upon heating passes directly from a solid state into a gaseous state. Substances which first become liquid and then are volatilized may require more careful heating and a somewhat longer heating period to insure a complete volatilization of the liquid which will, of course, find its way into and tend to remain in the small voids and spaces between the silver powder particles. This class of extraneous material should be volatilizable or sublimable without reacting with the silver and without leaving a residue. Various inorganic and organic materials may be used as the extraneous material, ammonium acid carbonate being one of the most feasible materials of this class.

In the use of this type of extraneous material, an intimate mixture of the silver powder and extraneous material is made and the powder mix pressed into the desired shape and size. The pressed compacts are then heated to temperatures at which the extraneous material is sublimed or volatilized, whereby this material is expelled from the compacts. This heating step should be conducted under such conditions as to avoid too rapid a sublimation or volatilization of the extraneous material. If this heating step is not so controlled, the sublimation or volatilization may be sufficiently rapid and violent to distort or deform the body or actually disintegrate the body.

A second class of extraneous material may be utilized, although for bodies of massive structure the first class of material is preferred. This second class of extraneous material includes those materials which will not react with the silver and which are not in themselves volatilizable or sublimable at the temperatures employed in the sintering of silver. These materials, when mixed with silver powder and heated, react with the atmosphere in which the bodies are heated to form gaseous reaction products. The highly porous silver bodies may be made by heating and sintering in air. A specific example of this second class of extraneous material is carbon. The silver powder and powdered carbon are mixed, pressed into the desired shape and size, and heated in air or an oxidizing atmosphere. The carbon becomes oxidized and is expelled in the form of carbon monoxide and carbon dioxide. It is apparent that this type of material should be utilized in instances where the thickness of the compact is rather small, since the oxidation of the carbon is dependent entirely upon the penetration of oxygen into the body.

A third type of extraneous material may be employed, this type of material being capable of reacting with the silver, and the silver compound is subsequently oxidized, whereby a gaseous reaction product of oxygen and the extraneous material is expelled. This class of materials is represented by arsenic. Powdered arsenic and powdered silver are thoroughly mixed, pressed, and the pressed compacts are heated in the air. It is possible that some of the arsenic may be oxidized directly, passing off as arsenic trioxide. It is believed, however, that most of the arsenic reacts with or alloys with silver to form an intermetallic compound. Upon further heating in air, the arsenic becomes oxidized and expelled as arsenic trioxide leaving a silver residue.

In the preparation of the highly porous silver bodies, the silver powder and the extraneous material, for example, ammonium acid carbonate, are thoroughly mixed as by ball milling and agitating for about one hour. The powder mix is pressed, for example, at a pressure of about 5 tons per square inch, to form a self-supporting body. The body is heated in air to a temperature of about 200° C. to 210° C. to volatilize or expel the ammonium acid carbonate and the temperature then slowly raised to about 550° C. and maintained at this temperature for about 30 minutes. The body is then cooled in air. The temperatures employed in expelling the ammonium acid carbonate and in sintering the silver may vary from about 200° C. to about 800° C. It is, of course, apparent that at the higher sintering temperatures the porosity of the body will be lower because of the increase in shrinkage normal in the sintering of powder compacts.

The relative proportions of silver powder and the extraneous or the sublimable material will determine the porosity of the sintered bodies, assuming that the compacting pressures and heating schedules are kept constant. The effect on the porosity may be illustrated by the following data:

| Percent Silver | | Percent NH₄HCO₃ | | Porosity |
|---|---|---|---|---|
| Volume | Weight | Volume | Weight | |
| Percent | Percent | Percent | Percent | Percent |
| 50 | 87 | 50 | 13 | 62.5 |
| 46 | 85 | 54 | 15 | 67.5 |
| 25 | 69 | 75 | 31 | 80 |
| 20 | 62.5 | 80 | 37.5 | 85.7 |

The foregoing bodies were prepared by thoroughly mixing the silver powder and ammonium acid carbonate and pressing the mixed powder at a pressure of about 5 tons per square inch. The silver powder was of a particle size so that substantially all of the powder passed through a 325 mesh screen. The ammonium acid carbonate particles passed through a 30 mesh screen and were retained on a 65 mesh screen. The particle sizes may be varied to alter porosity as is well known in the powder metallurgy art. The bodies were heated in air to a temperature of about 200° C. to expel the ammonium acid carbonate and the temperature subsequently raised to about 550° C. over a period of about 25 minutes. The bodies were maintained at this temperature for about 30 minutes to sinter the silver. The bodies were subsequently cooled in air.

The structure of the highly porous metal bodies made by the foregoing method is illustrated in Fig. 1. The body 1 consists of a plurality of silver particles 2 sintered into a coherent mass. The porosity of the body is attributable to the voids or interstices 3 between the particles.

Bodies having similar degrees of porosity but of a different structure may be formed by an alternative method. In this alternative method the mixture of silver powder and extraneous material is pressed at a relatively low pressure, for example, at about 5 tons per square inch, into a bar or rod. The extraneous material is then removed or expelled by a suitable heat treatment and the temperature then raised to a sintering temperature and maintained at such temperature for a brief period. The porous body thus formed is then reduced to provide porous chips or porous granules. The small porous pieces may also be prepared by pressing the mixture of silver powder and extraneous material into pellets, for example, of a size up to about 0.1 inch in diameter. The pellets are then subjected to a heat treatment to expel the extraneous material and to tack together the silver particles to form the porous pellets of sufficient mechanical strength for subsequent handling.

The porous granules, chips or pellets, whatever their specific form or by whatever method produced, are then pressed into the shape and size desired, or for the production of the very highly porous bodies they may be tamped in a silver form. The pressure will, of course, be dependent upon the porosity desired in the final product. The mass is then heated in the air to a temperature of between 300° C. and about 800° C. to sinter together the silver particles in the porous chips or pellets and to sinter together the chips or pellets. By this alternative method bodies may be prepared having a porosity as high as 85%.

The structure of bodies made by this alternative method is illustrated in Fig. 2. The body 4 consists of a plurality of silver particles 5 sintered into a coherent mass. Each of the silver particles 5 contains voids or interstices 6 which render the particles porous. Further porosity is imparted to the body 4 by the voids or interstices 7 in the porous particles 5. The body thus consists of porous particles 5 permanently joined into a coherent mass with irregular interstices 7 between the porous particles.

This alternative method may be illustrated by the preparation of the porous silver body formed from a mixture of about equal parts by volume of silver powder and ammonium acid carbonate. The silver powder was of a particle size so that substantially all of the powder passed through a 325 mesh screen. The ammonium acid carbonate particles passed through a 30 mesh screen and were retained on a 65 mesh screen. The powders were thoroughly mixed and pressed at about 5 tons per square inch into pellets having a diameter of about 0.1 inch. The pellets were heated in air to a temperature of about 200° C. to expel the ammonium acid carbonate and the temperature then raised to 300° C. to tack together the silver particles in the pellets. Such heat treatment is sufficient to provide porous pellets of sufficient mechanical strength for subsequent handling. The porosity of these pellets was about 60%.

The porous pellets are then tamped in a thin-walled silver form and the unit then heated in air to a temperature of between 300° C. and 800° C., preferably about 550° C. This sintering temperature is maintained for about 30 minutes to sinter together the silver particles forming the pellets and to sinter together the pellets. The porosity of such body is approximately 85%.

Such body may also be formed by pressing the powder mix into a bar and subjecting the bar to the necessary heat treatment to form a porous bar. The bar is reduced to porous chips or particles by machining and the chips employed in the same manner as the porous pellets.

In the preparation of these bodies, conventional lubricants used in the powder metallurgy art may be included in the powder mixture, such as stearates, waxes, paraffin and the like. A particularly satisfactory lubricant which has been employed is an atomized paraffin product marketed under the trade name Acrawax.

Porous bodies of silver alloys may be prepared in the same manner as described hereinbefore. The metal powder may consist of an intimate mixture of silver and the alloying metal or metals, or the powder may consist of the powdered alloy. It is obvious that in those cases where the mixture of metal powders is employed, the sintering temperature will be determined by the temperatures necessary for the absorption of the other metals by the silver or the alloying of the metals and silver. In my copending application, Serial No. 40,409, filed July 23, 1948, there is disclosed a method of preparing porous bodies composed of silver and copper.

For some purposes, the shape of the desired body may be such that it is difficult or impossible to press the powder into the desired shape. Such bodies must be prepared from a block or bar by a machining operation. The porous bodies of this invention, particularly when the porosity is of the order of 50% and higher, are soft and considerable difficulties are encountered in machining operations.

I have found that the porous bodies may be readily machined if they are impregnated with a suitable wax. The wax should not be too soft nor should it be brittle at ordinary temperatures. The wax should have a melting point sufficiently high to prevent appreciable softening due to the heat generated during machining. It should have a vaporization and burning temperature under about 500° C. and should be capable of being volatilized and burned without leaving a residue. Hard commercial waxes commonly used in forming wax models for the investment type process, generally referred to as the lost wax process, have been found very satisfactory. One such commercial wax which has been employed with highly satisfactory results is marketed under the trade name Zophar C-317.

The porous body, for example, a porous silver body having a porosity of about 65%, is impregnated with a wax of the type described to form a substantially solid body. If it is desired to provide relatively long cylindrical bodies having a protuberance at one end and a cavity in the other end, a large block of porous silver may be prepared and impregnated with the wax. The body may then be readily sawed into blanks of a desired size and turned in a lathe into the required cylindrical size having the protuberance. The cavity is drilled as required.

The body in its desired machined form is subsequently heated to a temperature of about 550° C. in air or a partial vacuum to remove the wax. When such body is heated in air, the wax becomes volatilized, and if the temperature is sufficiently high, the wax may burn. The body will first become blackened, and after all of the wax has been volatilized and burned, the body again assumes a bright silver color. This heat treatment has substantially no effect upon the porosity of the body or upon the shape and size of the body.

Bodies of silver and silver alloys may be prepared by the foregoing methods having a porosity of from about 35% to about 85% by these methods. The structure of the porous bodies may be a porous structure of relatively solid particles or of porous particles. The bodies may be prepared by pressing the powder into the desired shape and size or by forming blanks and machining the blanks into the desired size and shape. The porosity may be controlled by the particle sizes of the various materials, pressures and sintering conditions in accordance with powder metallurgy practices. Although the forming pressure mentioned specifically is about 5 tons per square inch, this pressure may be varied to suit individual conditions. Pressures of up to 20 or 25 tons per square inch may be used, however it is obvious that such higher pressures will reduce the porosity of the bodies.

I claim:

1. The method of forming porous silver bodies having a porosity exceeding 35% which comprises forming a mixture of silver powder and an extraneous material which may be expelled at a temperature below the sintering temperature of silver, pressing the mixture into pellets, heating the pellets to volatilize the extraneous material and to tack together the silver particles to form porous silver pellets, pressing the porous silver pellets into the desired shape and sintering the pressed shape to form a body consisting of porous particles permanently joined into a coherent mass with irregular interstices between the porous silver particles.

2. The method of forming porous silver bodies having a porosity exceeding 35% which comprises forming a mixture of silver powder and ammonium acid carbonate, pressing the mixture into pellets, heating the pellets to volatilize the ammonium acid carbonate and to tack together the silver particles to form porous silver pellets, pressing the porous silver pellets into the desired shape and sintering the pressed shape to form a body consisting of porous particles permanently joined into a coherent mass with irregular interstices between the porous silver particles.

3. The method of forming porous silver bodies having a porosity exceeding 35% which comprises forming a mixture of silver powder and an inorganic, powdered extraneous material which is expellable in a gaseous state at an elevated temperature, heating the said mixture to a temperature of about 200° C. to expel the said extraneous material and then further heating the residual material to a sintering temperature, thereby forming a porous sintered silver mass, comminuting the said porous sintered mass into porous particles, pressing the porous particles into the desired shape and sintering the pressed shape to form a body consisting of porous particles permanently joined into a coherent mass with irregular interstices between the said porous silver particles.

4. The method of forming porous silver bodies having a porosity exceeding 35% which comprises forming a mixture of silver powder and powdered ammonium acid carbonate, heating the said mixture to a temperature of about 200° C. to expel the said carbonate and then further heating the residual material to a sintering temperature, thereby forming a porous sintered silver mass, comminuting the said porous sintered mass into porous particles, pressing the porous particles into the desired shape and sintering the pressed shape to form a body consisting of porous particles permanently joined into a coherent mass with irregular interstices between the said porous silver particles.

5. The method of forming porous silver bodies having a porosity exceeding 35% which comprises forming a mixture of silver powder and an inorganic, powdered extraneous material which is expellable in a gaseous state at an elevated temperature, heating the said mixture to a temperature of about 200° C. to expel the said extraneous material and then further heating the residual material to a sintering temperature, thereby forming a porous sintered silver body, pressing a plurality of such porous bodies into the desired shape and sintering the pressed shape to form a larger porous body consisting of the individual porous bodies permanently joined into a coherent mass with irregular interstices between the said individual porous silver bodies.

CLAIRE C. BALKE.

References Cited in the file of this patent

UNITED STATES PATENTS

| Number | Name | Date |
|---|---|---|
| 1,051,814 | Lowendahl | Jan. 28, 1913 |
| 1,761,506 | Williams | June 3, 1930 |
| 1,823,869 | Bauer | Sept. 15, 1931 |
| 1,873,223 | Sherwood | Aug. 23, 1932 |
| 2,121,448 | Ritzau | June 21, 1938 |
| 2,153,397 | Sandler | Apr. 4, 1939 |
| 2,155,592 | Hardy | Apr. 25, 1939 |
| 2,199,620 | Davis | May 7, 1940 |
| 2,200,369 | Klinker | May 14, 1940 |
| 2,315,876 | Sivil et al. | Apr. 6, 1943 |
| 2,447,980 | Hensel | Aug. 24, 1948 |
| 2,450,339 | Hensel | Sept. 24, 1948 |
| 2,457,861 | Brassert | Jan. 4, 1949 |
| 2,476,208 | Middleton | July 12, 1949 |

FOREIGN PATENTS

| Number | Country | Date |
|---|---|---|
| 536,653 | Great Britain | May 22, 1941 |
| 574,583 | Great Britain | Jan. 11, 1946 |
| 583,371 | Great Britain | Dec. 17, 1946 |